United States Patent [19]

La Roque

[11] Patent Number: 5,727,805
[45] Date of Patent: Mar. 17, 1998

[54] ADJUSTABLY EXTENSIBLE TRAILER HITCH ASSEMBLY

[76] Inventor: Stanley R. La Roque, Box 1968, Pahrump, Nev. 89041

[21] Appl. No.: 594,733

[22] Filed: Jan. 31, 1996

[51] Int. Cl.⁶ .................................................. B60D 1/42
[52] U.S. Cl. .................. 280/478.1; 280/490.1; 280/491.2
[58] Field of Search .................. 280/494, 477, 280/478.1, 479.2, 479.3, 490.1, 491.2, 506, 488, 493

[56] References Cited

U.S. PATENT DOCUMENTS

| | | |
|---|---|---|
| D. 317,426 | 6/1991 | Lytle. |
| 4,134,602 | 1/1979 | Boger ...................... 280/479.2 |
| 4,350,362 | 9/1982 | Landers. |
| 4,944,525 | 7/1990 | Landry. |
| 4,991,865 | 2/1991 | Francisco. |
| 5,011,176 | 4/1991 | Eppinette. |
| 5,277,447 | 1/1994 | Blaser. |
| 5,322,315 | 6/1994 | Carsten. |
| 5,342,076 | 8/1994 | Swindell. |
| 5,358,269 | 10/1994 | Jakeman et al. ............ 280/490.1 |
| 5,647,604 | 7/1997 | Russell ........................ 280/494 |

*Primary Examiner*—Brian L. Johnson
*Assistant Examiner*—Avraham H. Lerner
*Attorney, Agent, or Firm*—David S. Thompson

[57] ABSTRACT

An adjustably extensible trailer hitch assembly changing a trailer hitch which allows a driver trying to back up into the correct position to conveniently attach a trailer hitch more room for error. The trailer hitch provides a top plate assembly that attaches to standard holes provided in most factory bumpers. The top plate provides a vertically oriented pivot pin. A hitch receiver having a square steel tube body is pivotally mounted on the pivot pin. A hitch extension arm having an elongate pivot pin opening is also pivotally mounted, and is slidably carried by the hitch receiver. The extension arm carries an end plate on its rearward end, having a matrix of bolt holes which are adjustably attached to a ball mount plate also having a matrix of bolt holes. The ball mount bracket can therefore be attached to the extension arm at a variety of elevations. A U-lock pin, carried by the top assembly, may be lifted to an upper position which allows the hitch receiver to pivot, and is moved by gravity to a lower position preventing the hitch receiver from pivoting when the receiver is perpendicular to the bumper. A locking bolt prevents the hitch extension arm from extending, and also prevents the U-lock pin from moving to the upper position.

8 Claims, 4 Drawing Sheets

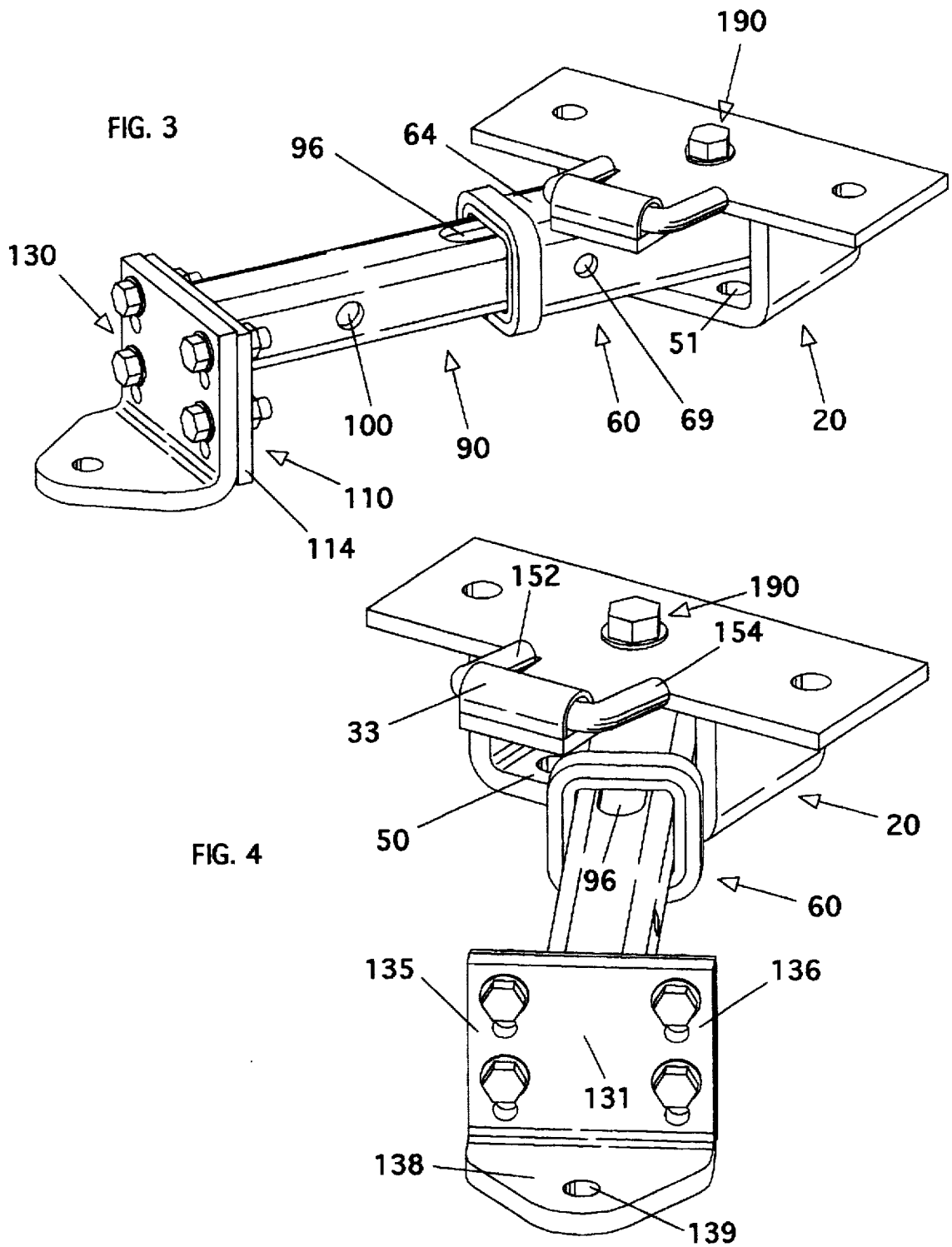

FIG. 11A, FIG. 11B, FIG. 11C, FIG. 11D, FIG. 12, FIG. 13, FIG. 14

ADJUSTABLY EXTENSIBLE TRAILER HITCH ASSEMBLY

CROSS-REFERENCES

There are no applications related to this application filed in this or any foreign country.

BACKGROUND

Several trailer hitch designs are known that both extend axially and pivot horizontally. Such trailer hitches allow a user to back a tow vehicle to a position where the hitch ball is near the trailer's hitch mechanism and then extend and pivot the hitch ball so that it is immediately adjacent to the trailer's hitch mechanism. This allows the user to position the tow vehicle with less accuracy, and saves the time and labor of repeated attempts.

A typical type of known extendible trailer hitch provides a telescopically extendible arm having the hitch ball attached to the rearward end. The arm extends radially from a retracted "travel" position within a tubular receiver to an extended position that is prevented from further extension by some type of keeper or latch structure.

Similarly, pivot mechanisms are known that allow the user to pivot the hitch arm so that it may be pointed directly at the trailer's hitch mechanism. This allows the user to position the hitch ball accurately within a somewhat semi-circular region having a radius of approximately six inches.

Once the hitch is attached, the user pulls forward with the tow vehicle, straightening the angle between the tow vehicle's hitch mechanism and the trailer's hitch mechanism. Structures are known which then change state, thereby preventing further pivoting by the pivot mechanism. The user then reverses the tow vehicle, thereby retracting the extendible arm. The user then activates a locking mechanism which prevents extension, and retains the arm in the retracted, "travel" position.

Unfortunately, the structures known that automatically engage to prevent further pivoting generally depend on spring-loaded bolts that snap the bolt into a hole when that hole pivots into the path of the bolt. Such spring loaded bolts are often not entirely effective. They are prone to freezing, binding, and the degradation of the spring. As a result, the bolt frequently fails to advance, and the pivoting mechanism continues to pivot. The user must then, by trial and error, stop the tow vehicle when the trailer is straight, and attempt to engage the bolt. Moreover, such bolts tend to be difficult to retract against the bias of the spring. One hand must be used to retract the bolt, and the other hand must be used to pivot the extendible arm, thereby preventing the bolt from immediately returning to its locked position. Generally, the bolt is difficult to retract, since the spring is often over-sized in an attempt to prevent freezing, binding, and degradation over time.

Another problem facing a driver attempting to hitch a trailer, is that the trailer hitch is often too high or too low to properly be connected to the trailer hitch mechanism. This is a failure by the hitch mechanism to compensate for the height differences between 2- and 4-wheel drive vehicles, cars and trucks, etc. This can result in an unbalanced, unsafe driving condition. Moreover, it is frequently the case that different trailers require a hitch ball at different heights, and a hitch ball that has been adjusted for a first trailer might not operate safely with a second trailer that is often towed by the same tow vehicle.

What is needed is an adjustably extensible trailer hitch mechanism that allows a user to extend an arm supporting a hitch ball in a telescopic manner, and then to pivot that arm to locate it immediately adjacent to the trailer hitch mechanism. The hitch mechanism must also allow the user to easily adjust the height of the hitch ball to accommodate smaller utility and golf cart trailers, mid-sized boat trailers, and larger recreational vehicle trailers. The vertical adjustment must also compensate for the height of the tow vehicle, which can vary from tall 4-wheel drive trucks to much smaller cars. The hitch mechanism must also provide structures that automatically prevent unwanted pivoting of the hitch that are more reliable, simpler, easier to operate, and less expensive to manufacturer than the presently known structures.

SUMMARY

The present invention is directed to an apparatus that satisfies the above needs. A novel adjustably extensible trailer hitch assembly is provided that extends radially from a retracted "travel" position to an extended position in which the hitch ball may be positioned adjacent to a trailer's hitch mechanism. A pivot mechanism is provided that allows the arm supporting the hitch ball to pivot side-to-side in the horizontal plane so that the hitch ball may be correctly positioned. A U-lock pin is provided, which replaces conventional spring-loaded bolt structures, and prevents pivoting when locked. An adjustable bracket assembly is provided that allows the hitch ball to be adjusted vertically, so that tow vehicles and trailers of different heights may be accommodated.

The adjustably extensible trailer hitch assembly of the present invention provides:

(a) A top plate assembly. The top plate assembly provides a bumper attachment plate having holes sized to be belted to the hole pattern found as standard equipment in many vehicle bumpers. An extension plate is rearwardly directed and supports a U-lock pin retaining bracket. A U-shaped bracket is supported by the lower side of the bumper attachment plate. A vertically oriented pivot bolt is supported by centrally located bolt holes in the attachment plate and the bottom plate of the U-shaped bracket.

(b) A hitch receiver. The hitch receiver is a square tube having rounded corners that pivots in a horizontal plane on the vertical pivot bolt within the U-shaped bracket of the top plate assembly.

(c) A hitch extension arm. The hitch extension arm is incrementally smaller in cross-section than the hitch receiver, and slides axially within the hitch receiver. An elongate pivot bolt opening allows the hitch extension arm to pivot in a horizontal plane about the pivot bolt. Because the pivot bolt opening is elongate, the hitch extension arm also is able to slide axially within the hitch receiver.

(d) An extension arm end plate. The rearward end of the extension arm carries an extension arm end plate that is vertically oriented. The plate provides an array of four bolt holes, typically consisting of two columns and two rows.

(e) A ball mount bracket. A ball mount bracket provides a vertically oriented attachment plate and a horizontally oriented hitch ball support plate. The attachment plate typically provides eight bolt holes arrayed in two columns that allow attachment to the extension arm end plate in four distinct positions. Each position corresponds to a distinct elevation of the hitch ball, thereby permitting vertical adjustment of the hitch ball support plate and the hitch ball.

(f) A U-lock pin, carried by the U-lock pin retaining bracket of the top plate assembly. The U-lock pin pivots between an upward position which allows the hitch receiver and hitch extension arm to pivot, and a lower position that prevents such pivoting movement. Gravity tends to bias the U-lock pin to the lower position, causing the U-lock pin to fall to the lower position when the hitch receiver and the hitch extension arm are perpendicular to the bumper attachment plate of the top plate assembly.

(g) A locking pin. A locking pin prevents axially extending movement by the hitch extension arm within the hitch receiver. The locking pin also prevents rotation of the U-lock pin.

It is therefore a primary advantage of the present invention to provide a novel adjustably extensible trailer hitch assembly that allows the user to attach a trailer hitch to the hitch ball of a tow vehicle more easily, and which prevents repeated trial-and-error attempts to correctly position the tow vehicle.

Another advantage of the present invention is to provide a novel adjustably extensible trailer hitch assembly that allows a user to adjustably extend the arm supporting the hitch ball to a position closer to the trailer's hitch assembly.

Another advantage of the present invention is to provide an adjustably extensible trailer hitch assembly that may be pivoted in the horizontal plane about a vertical bolt to better position the hitch ball next to the trailer hitch assembly.

Another advantage of the present invention is to provide an adjustably extensible trailer hitch assembly having a hitch ball that is vertically adjustable to accommodate trailers having trailer hitch assemblies of various heights, and to accommodate tow vehicles of different heights, such as two- and four-wheel drive vehicles.

Another advantage of the present invention is to provide an adjustably extensible trailer hitch assembly having a U-lock pin assembly that allows the hitch extension arm to pivot when the U-lock pin is in an upper position, but that prevents pivotal movement when the U-lock pin is in a lower position. The U-lock pin automatically moves to the lower position when the hitch extension arm is perpendicular to the top plate assembly.

A still further advantage of the present invention is to provide an adjustably extensible trailer hitch assembly having a locking pin that prevents extension of the adjustable arm when the trailer hitch is in travel position, and that also prevents the U-lock pin from moving to a position where rotation is allowed.

DRAWINGS

These and other features, aspects, and advantages of the present invention will become better understood with regard to the following description, appended claims, and accompanying drawings where:

FIG. 3 is a perspective view of a version of the invention having the hitch extension arm fully extended and rotated to the right;

FIG. 4 is a perspective view of a version of the invention having the hitch extension arm fully extended and rotated to the left;

FIG. 11A is a perspective view of the hitch extension arm, the extension arm end plate, and the ball mount bracket showing the hitch ball support plate fully elevated;

FIG. 11B is a perspective view of the hitch extension arm, the extension arm end plate, and the ball mount bracket showing the hitch ball support plate partly elevated;

FIG. 11C is a perspective view of the hitch extension arm, the extension arm end plate, and the ball mount bracket showing the hitch ball support plate partly lowered;

FIG. 11D is a perspective view of the hitch extension arm, the extension arm end plate, and the ball mount bracket showing the hitch ball support plate fully lowered;

FIG. 12 is a side view of the hitch extension arm, the extension arm end plate, and the ball mount bracket;

FIG. 13 is an end view of the hitch extension arm, the extension arm end plate, and the ball mount bracket;

FIG. 14 is a top view of the hitch extension arm, the extension arm end plate, and the ball mount bracket.

DESCRIPTION

Figure 1:
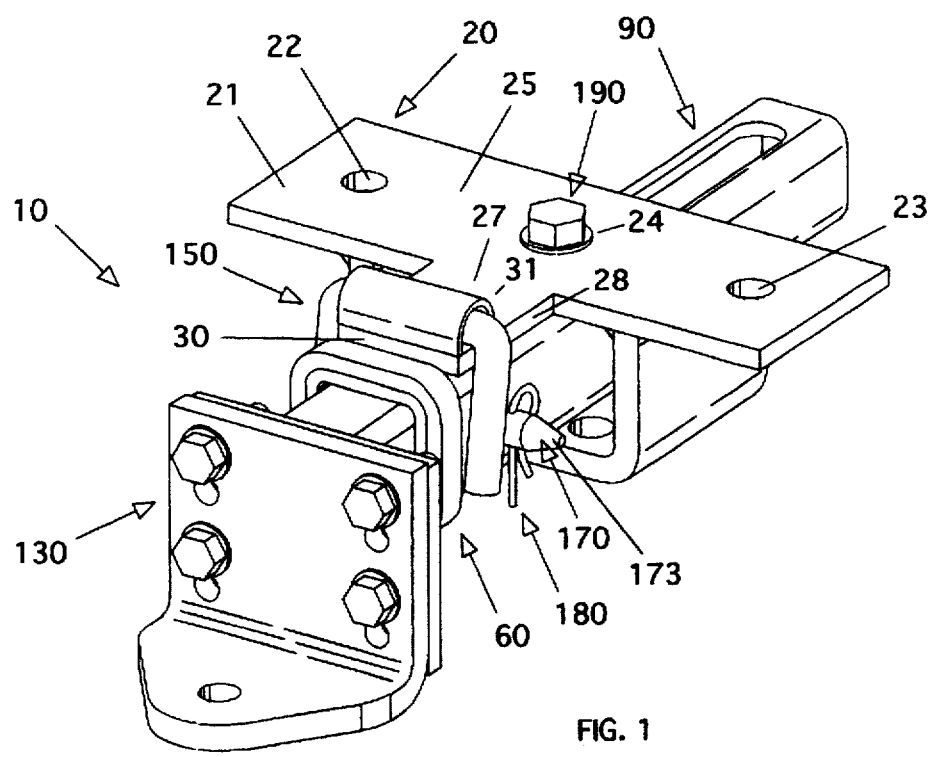
FIG. 1 is a perspective view of a version of the invention having the hitch extension arm retracted fully into the hitch receiver.
Figure 2:
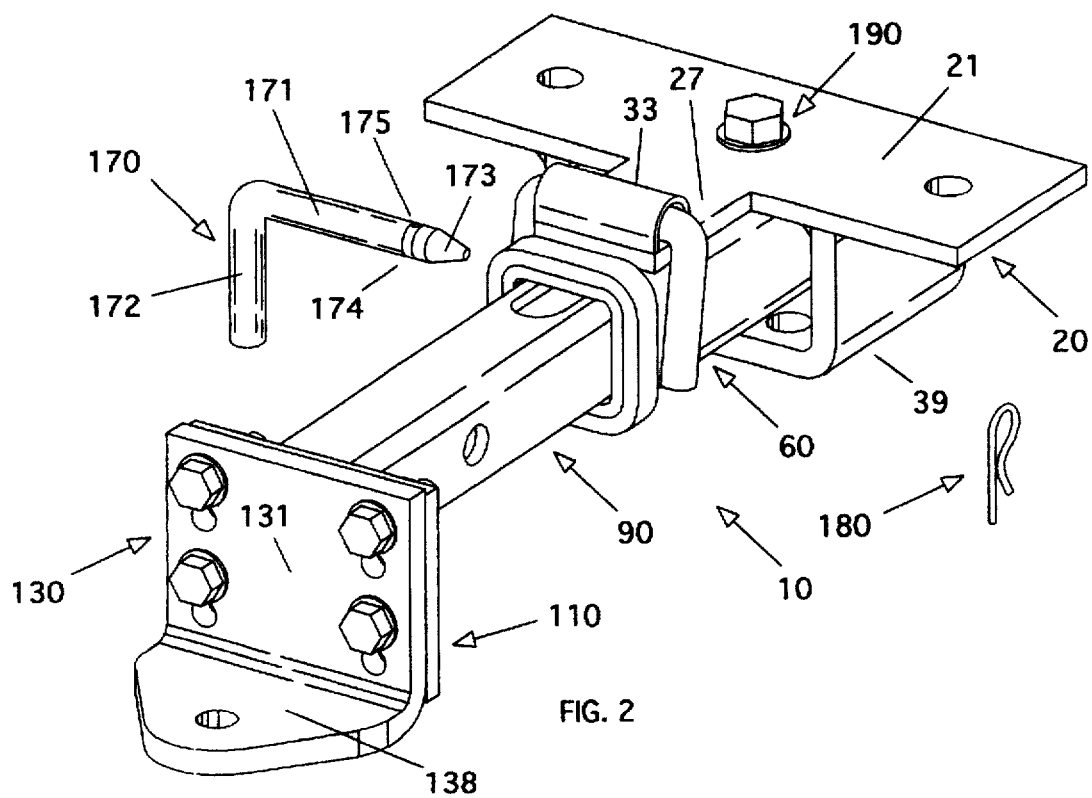
FIG. 2 is a perspective view of a version of the invention having the hitch extension arm fully extended.

Referring in particular to FIG. 1, an adjustably extensible trailer hitch assembly 10 constructed in accordance with the principles of the invention is seen. The trailer hitch provides a top plate assembly 20 that attaches to the bolt pattern that is standard on most bumpers. The top plate assembly 20 pivotably carries a hitch receiver 60 that is pivotably in a horizontal plane about a vertical pivot bolt 190. A hitch extension arm 90 is carried within the hitch receiver 60, and telescopes axially between a retracted "travel position" and an extended position that may be adjusted to position the hitch ball immediately adjacent to the hitch of a trailer to be towed. An extension arm end plate 110 having a plurality of bolt holes is carried by the end of the extension arm 90. A ball mount bracket 130 having a matrix of bolt holes is attachable to the extension arm end plate in a variety of manners, each corresponding to a different hitch ball elevation. A U-lock pin 150, carried by the top plate assembly 20 is manually moved to an upper position that allows the hitch receiver 60 and the hitch extension arm 90 to pivot. After attaching the trailer, the driver pulls forward a short distance, which allows the hitch receiver to straighten, causing the U-lock pin 150 to fall due to gravity to a lower position, which prevents pivoting by the hitch receiver. Reversing the direction of the tow vehicle for a short distance causes the extension arm 90 to retract into the hitch receiver 60, thereby returning the hitch to the travel position. The hitch extension arm 90 may then be locked to the hitch receiver 60 to prevent axial movement by means of a locking bolt 170. Locking bolt 170 also prevents movement of the U-lock pin into the upper position.

Figure 5:
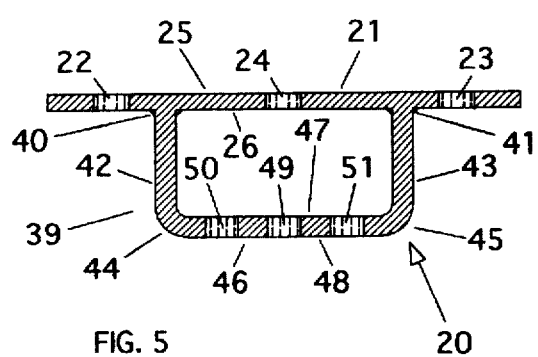
FIG. 5 is a cross-sectional view of the top plate assembly, along the 5—5 lines of FIG. 7.

The top plate assembly 20 provides a bumper attachment plate 21 having a left bolt hole 22, a right bolt hole 23, and a pivot bolt hole 24. In the preferred embodiment, the bumper attachment plate 21 is 4 inches by 11 inches, and is made of ⅜ inch thick steel plate. An upper surface 25 and a lower surface 26 are seen in FIG. 5. The pivot bolt hole 24 is ¾ inch in diameter, and is centrally located. The left and fight bolt holes 22, 23 are ⅝ inch in diameter, and have centers that are located 1.5 inches from the mid-points of the 4 inch sides.

Figure 6:
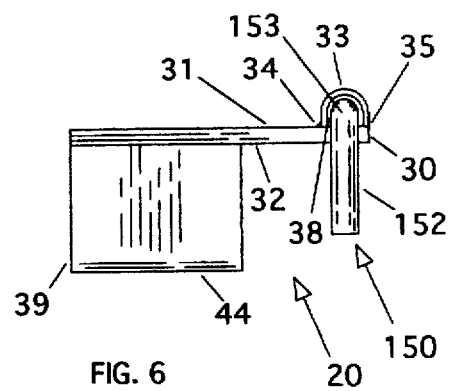
FIG. 6 is a side view of the top plate assembly.
Figure 7:
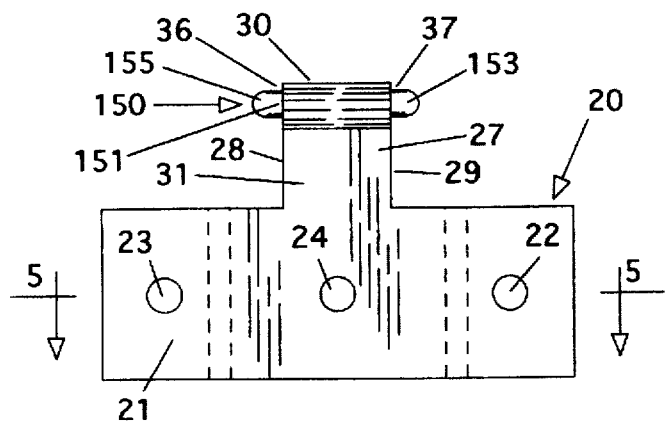
FIG. 7 is a top view of the top plate assembly.
Figure 9:
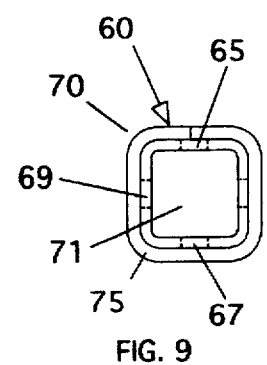
FIG. 9 is an end view of the hitch receiver.
Figure 8:
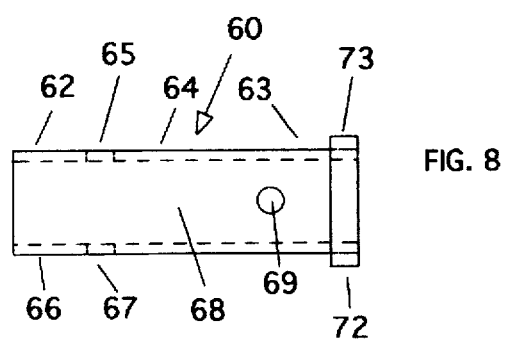
FIG. 8 is a side view of the hitch receiver.

An extension plate 27 is 2.5 inches wide and extends 3 inches outwardly from the center of attachment plate 21, as seen in FIG. 7. The extension plate provides a right edge 28, a left edge 29, and a rear edge 30. An upper surface 31 and a lower surface 32 are seen in FIG. 6.

A U-lock pin retaining bracket 33 is seen in FIGS. 1 and 6. The retaining bracket 33 is saddle shaped, and provides a forward edge 34 and a rearward edge 35. A left end opening 36 and a right end opening 37 allow the U-lock pin 150 to protrude, as will be seen. A channel 38 extends between the openings 36, 37. In the preferred embodiment, the retaining bracket 33 is made of a curved piece of steel plate having a height of 1 inch and a length of 2.5 inches, and a thickness of ⅛ inch. The retaining bracket 33 is typically attached to the upper surface 31 of the extension plate 27 by welding.

A U-shaped bracket 39 is carried by the lower surface 26 of the bumper attachment plate 21. The U-shaped bracket 39 is formed from a sheet of steel that is approximately 12 inches by 4 inches and ⅛ inch thick. Left and right bends 44, 45 cause the sheet of steel to assume U-shaped appearance. A left upper edge 40 and a right upper edge 41 are welded to the lower surface 26 of plate 21. Vertically oriented left and right sides 42, 43 support a bottom plate 46. As seen in FIG. 5, the bottom plate 46 provides an upper surface 47 that supports the hitch receiver 60, and an oppositely directed lower surface 48. The distance from the upper surface 47 of the bottom plate 46 of the U-shaped bracket 39 to the lower surface 26 of the bumper attachment plate 21 is typically about 2 ⅝ inches. A pivot bolt hole 49 is centrally located, and is typically ¾ inch in size to correspond with the upper pivot bolt hole 24 in the bumper attachment plate 21. Left and right safety chain holes 50 and 51 allow the user to attach the standard S-hook or similar type of safety chain attachment structures.

The pivot bolt 190 is carded by the pivot bolt hole 24 in the bumper attachment plate 21 of the top plate assembly 20 and also pivot bolt hole 49 in the bottom plate 46 of the U-shaped bracket 39 of the top plate assembly 20. The pivot bolt 190 is typically a ¾ inch bolt, and allows both the hitch receiver 60 and the hitch extension arm 90 to pivot in a horizontal plate about the bolt.

Figure 10:
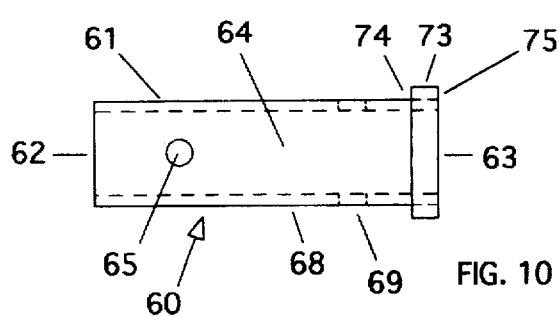
FIG. 10 is a top view of the hitch receiver.
Figure 15:
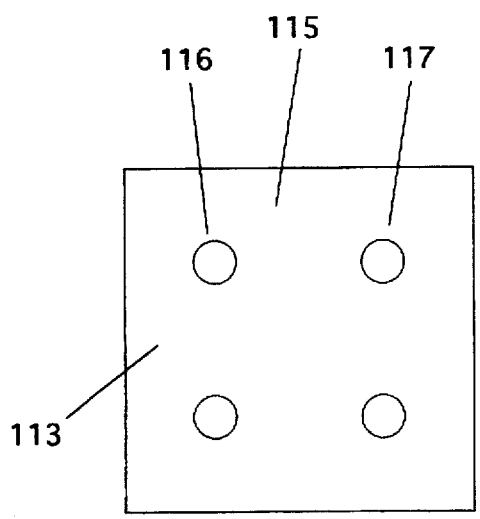
FIG. 15 is an end view of the extension arm end plate with the ball mount bracket removed.

A hitch receiver 60 having a tube-like body 61 and a collar 72 is pivotally carried by the pivot bolt 190 in the top plate assembly 20. The body 61 provides an open forward end 62 and an open rearward end 63. The body 61 is hollow, and a channel 71 runs the length of the body. The body has an upper surface 64 having a hole 65 for the pivot bolt 190 and a lower surface 66 having a similar pivot bolt hole 67. Side surfaces 68 have holes 69 which carry the locking bolt 170. The collar provides an outer surface 73, a forward surface 74, and a rearward surface 75, as seen in FIG. 10.

In the preferred embodiment, the body 61 of the hitch receiver is made of square tubing having rounded corners 70 and 2.5 inch sides. The length of the body 61 is 8 inches. The upper and lower pivot bolt holes 65, 67 are ¾ inches in diameter and have centers 2 inches from the forward end 62. The left and fight locking pin holes 69 are ⅝ inches in diameter and have centers 2.5 inches from the rearward end 63. The collar 72 is formed from a 10 inch long, ⅝ inch wide piece of 5⁄16 inch thick steel that is wrapped hot around the rearward 63 of the body 61 and welded into place.

The hitch extension arm 90 is pivotally carried by the pivot bolt 190, and is slidably carded inside the hitch receiver 60. The hitch extension arm 90 is formed of square steel tubing having rounded corners 94. A forward end 91 is open, while a similar rearward end 92 is attached to the extension arm end plate 110. An interior channel 93 runs the length of the tube. The upper surface 95 and the lower surface 97 provides similar elongate pivot bolt openings 96, 98 that allow the extension arm to pivot about the pivot bolt 190. The elongate nature of the pivot bolt openings 96, 98 allow the extension arm 90 to slide within the hitch receiver 60. The side surfaces 99 each have a locking pin hole 100 which is sized to match the locking bolt 170.

In the preferred embodiment, the hitch extension arm is 15 inches long, and is made from square ¼ inch thick tubing having 2 inch sides and rounded corners. The elongate pivot bolt openings 96, 98 are typically about 7 inches long, to allow the hitch extension arm 90 to travel 7 inches within the hitch receiver. Locking pin holes 100 are typically ⅝ inch in diameter, and have centers that are 3.5 inches from the rearward end 92 of the arm 90. When the extension arm is perpendicular to the bumper attachment plate 21, and fully extended, pivoting the extension arm will rotate the hitch ball through a distance of approximately 8 inches to either the left or right. This distance is primarily a function of the length of the arm 90 and the dimensions of the top plate assembly 20.

The extension arm end plate 110 is attached to the rearward end 92 of the hitch extension arm 90 by means of welded connection. The end plate 110 provides a forward surface 112, a rearward surface 113, and a perimeter surface 114, as seen in FIGS. 11-15. A matrix of adjustment holes 115 is provided, typically arrayed in a left column 116 and a right column 117.

Figures 11A, 11B, 11C, 11D, 12, 13, 14:
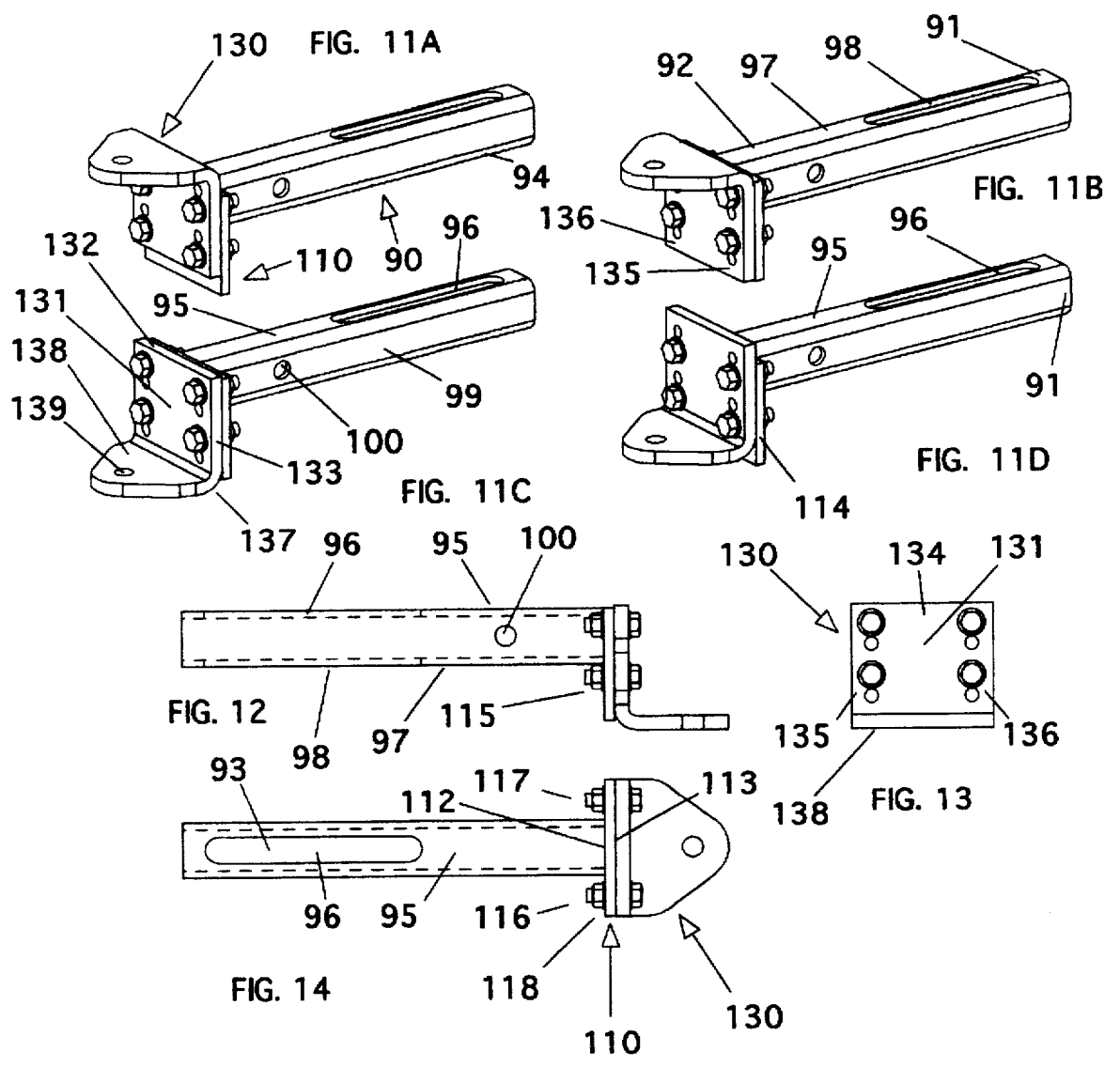

In the preferred embodiment, the extension arm end plate 110 is 5 inches horizontally and approximately 4.25 inches vertically, as seen in FIGS. 12 and 13. Eight adjustment holes 115 are typically provided, each suitable for ⅜ or ½ inch bolts.

The ball mount bracket 130 is fastened to the extension arm end plate 110 by means of fastening hardware 118, typically including ⅜ or ½ inch diameter bolts or other suitable fastener. The ball mount bracket 130 provides a vertically oriented attachment plate 131 and a horizontally oriented hitch ball support plate 138, separated by a rounded 90 degree bend 137, as seen in FIG. 11.

The attachment plate 131 provides an end edge 132 and left and right side edges 133. A matrix of adjustment holes 134 sized and arranged to complement the matrix of holes 115 on the extension arm end plate 110 is provided, typically arrayed in a first column 135 and a second column 136. The ball mount bracket 130 may be oriented with the hitch ball support plate 138 located above attachment plate 131, as seen in FIGS. 11A and 11B. Alternatively, the ball mount bracket 130 may be oriented with the hitch ball support plate 138 located below the attachment plate 131, as seen in FIG. 11C and 11D. In practice, this usually means that the extension arm 90, the extension arm end plate 110, and the ball mount bracket 130 are removed as a unit from the hitch receiver 60 after removing the pivot bolt 190 and replaced after a 180 degree rotation. The hitch ball is then installed in the proper orientation.

The hitch ball support plate 138 provides a hitch ball bolt hole 139 which will ridgidly support any type of hitch ball, typically from 1 ⅞ inch to 2.5 inch, although a 2 inch hitch ball is standard.

In the preferred embodiment, the ball mount bracket 130 is formed of steel plate having a width of 5 inches and length prior to the formation of bend 137 of approximately 8.5 inches. After bend 137 is made, the attachment plate 131 has a height of approximately 4.5 inches and the hitch ball support plate extends approximately 4 inches from the extension arm end plate 110.

A U-lock pin 150 is carried by the U-lock pin retaining bracket 33 of the top plate assembly 20. The U-lock pin is rotatable from an upper position, seen in FIG. 3, to a lower position, seen in FIG. 1. In the lower position, where the pin 150 is biased by gravity, the hitch receiver 60 is prevented from pivoting on the pivot bolt 190. When the U-lock pin is held in the upper position, a user may pivot the hitch receiver about the pivot bolt. Once the hitch receiver is pivoted, the upper surface 64 of the hitch receiver supports the U-lock pin, as long as the hitch receiver is not perpendicular to the long side of the bumper attachment plate 21. As seen in FIG. 1, when the hitch receiver 60 is perpendicular to the bumper attachment plate, the U-lock pin falls to the lower position, preventing the hitch receiver from pivoting. As seen in FIG. 3, when the hitch receiver is not perpendicular to the attachment plate, the U-lock pin is in the raised position, supported by the hitch receiver. As seen by a comparison of FIGS. 1 and 3, the U-lock pin 150 rotates freely in bracket 33. A middle section 151 is approximately the length of the rear edge 30 of the extension plate 27. Left and right bends 153, 155 and associated left and right segments 152, 154 are seen in FIGS. 5 and 6.

In the preferred embodiment, the middle section 151 is approximately 2.5 inches in length. Left and right segments 152, 154 are approximately 2 inches in length, and the the U-lock pin is approximately ⅝ inch in diameter.

The locking bolt 170 is carried by the locking pin holes 69 in the hitch receiver 60 and by the locking pin holes 100 in the side surfaces 99 of the hitch extension arm 90. When the locking bolt 170 is inserted through these holes, movement of the hitch extension arm 90 relative to the hitch receiver 60 is prevented. However, when the locking bolt 170 is removed, the hitch extension arm 90 may move axially within the hitch receiver 60 a distance equal to the length of the elongate pivot bolt openings 96, 98 in the hitch extension arm. Additionally, when the locking bolt 170 is inserted, the U-lock pin 150 is prevented from rotating out of is lower position, where pivoting of the hitch receiver is prevented.

The locking belt 170 provides a straight body 171, a bent end 172, and a tapered point 173. The tapered point is adjacent to a pin hole 175 used to secure locking pin 180. An optional annular recess 174 prevents unwanted movement of the locking pin 180. The bent end 172 is bent to prevent its passage into the holes 69, 100. The tapered point 173 allows easier insertion of the bolt 170 into holes 69, 100.

In the preferred embodiment, the locking bolt 170 is typically 5 to 6 inches in length and ⅝ inches in diameter. The straight body 171 is approximately 3.5 inches long, while the bend end 172 is approximately 2 inches long.

As seen in FIG. 1, the locking pin 180 is inserted into the hole 175, and prevents the locking bolt 170 from falling out due to vibration during travel.

Prior to use, the user should adjust the elevation of the hitch ball bolt hole 139 to the appropriate level. This may be done by releasing the fasteners 118 holding the extension arm end plate 110 to the ball mount bracket 130 and repositioning the ball mount bracket. In some instances, it is easier to release the pivot bolt 190, and rotate the hitch extension arm 90 by 180 degrees. Therefore, it can be seen that the left column of adjustment holes 116 may be attached to either the first or second column of adjustment holes 134, 136 of the ball mount bracket 130, depending on the need. As a result, the right column of adjustment holes 117 will be attached to either the second or first column of adjustment holes 136, 134. The hitch ball must then be installed right side up.

To use the adjustably extensible trailer hitch of the invention, the user should back a tow vehicle into the area of a trailer to be towed. Due to the capabilities of the trailer hitch disclosed, it is not necessary that the hitch ball of the tow vehicle be positioned exactly. The user then removes the locking pin 180 and the locking bolt 170. This allows the hitch extension arm to be extended, as needed. The user then lifts the U-lock pin to a 90 degree or greater angle, as seen in FIG. 3, and pivots and extends the hitch receiver 60 and hitch extension arm 90 as required to positioned the hitch ball as near to the trailer's hitch mechanism as possible. The trailer hitch is then attached to the hitch ball of the tow vehicle's hitch assembly. If they will reach, the safety chains are then attached to the safety chain holes 50, 51. The user then drives forward a short distance. This movement causes the hitch extension arm 90 to become perpendicular with the bumper attachment plate 21, which allows gravity to lower the U-lock pin 150 to its lower position, thus preventing further pivoting. The user then may put blocks behind the trailer's wheels, if desired, and back the tow vehicle so that the extension arm 90 is retracted fully into the hitch receiver 60. At this point the locking pin holes 69 and 100 are aligned, and the locking bolt 170 and locking pin 180 may be installed. If not already done, the safety chains should be attached. The trailer hitch is now in the travel position.

The previously described versions of the present invention have many advantages, including a novel adjustably extensible trailer hitch assembly that allows the user to attach a trailer hitch to the hitch ball of a tow vehicle more easily, and which prevents repeated trial-and-error attempts to correctly position the tow vehicle.

Another advantage of the present invention is to provide a novel adjustably extensible trailer hitch assembly that allows a user to adjustably extend the arm supporting the hitch ball to better position the hitch ball next to the trailer hitch assembly.

Another advantage of the present invention is to provide an adjustably extensible trailer hitch assembly that may be pivoted about a vertical bolt to better position the hitch ball next to the trailer hitch assembly.

Another advantage of the present invention is to provide an adjustably extensible trailer hitch assembly having a hitch ball that is vertically adjustable to accommodate trailers having trailer hitch assemblies of various heights, and to accommodate tow vehicles of different heights, such as two- and four-wheel drive vehicles.

Another advantage of the present invention is to provide an adjustably extensible trailer hitch assembly having a U-lock pin assembly that allows the hitch extension arm to pivot when the U-lock pin is in an upper position, and where the U-lock pin moves automatically by means of gravity to a lower position that prevents pivotal movement.

A still further advantage of the present invention is to provide an adjustably extensible trailer hitch assembly having a locking pin that prevents extension of the adjustable arm when the trailer hitch is in travel position, and that also prevents the U-lock pin from moving to a position where rotation is allowed.

Although the present invention has been described in considerable detail and with reference to certain preferred versions, other versions are possible. For example, while the dimensions of the components of the preferred embodiment have been disclosed, variations in the dimensions are possible, while staying within the scope and teachings of the invention. Also, while the bolt patterns disclosed on the hitch extension arm end plate and the ball mount bracket are preferred, a variety of other bolt patterns would be possible. Further, the use of bolts to attach the extension arm end plate to the ball mount bracket is not required, and other fasteners may be substituted. Therefore, the spirit and scope of the appended claims should not be limited to the description of the preferred versions disclosed here.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A trailer hitch assembly, comprising:
   (a) a top plate assembly, adapted to be carried by a bumper of a tow vehicle, carrying a pivot bolt;
   (b) a hitch receiver, pivotally mounted on the pivot bolt;
   (c) a hitch extension arm, supporting a hitch ball, slidably carried within the hitch receiver and pivotally mounted on the pivot bolt;
   (d) a U-lock pin, carried by the top plate assembly, pivotable between an upper position that does not interfere with the pivotal movement of the hitch receiver, and a lower position that prevents the pivotal movement of the hitch receiver; and
   (e) locking means for preventing the axial extension of the hitch extension arm relative to the hitch receiver.

2. The trailer hitch assembly of claim 1, in which the locking means comprises:
   (a) a locking bolt removably insertable into a pair of locking pin holes in the hitch receiver and a pair of locking pin holes in the hitch extension arm.

3. The trailer hitch assembly of claim 1, further comprising:
   (a) a hitch extension arm end plate, carried by the rearward end of the hitch extension arm; and
   (b) a ball mount bracket, carried by the hitch extension arm end plate, rigidly carrying the hitch ball.

4. The trailer hitch assembly of claim 3, further comprising:
   (a) the extension arm having a matrix of adjustment holes;
   (b) the ball mount bracket having a matrix of adjustment holes; and
   (c) fastener means for attaching the matrix of adjustment holes in the extension arm end plate to the matrix of adjustment holes in the ball mount bracket, after the ball mount bracket is positioned at a desired elevation.

5. A trailer hitch assembly, comprising:
   (a) a top plate assembly, adapted to be carried by a rear bumper of a tow vehicle, having a pivot bolt;
   (b) a hitch receiver, pivotally mounted on the pivot bolt;
   (c) a hitch extension arm, having a forward and a rearward end, slidably carried within the hitch receiver and pivotally mounted on the pivot bolt;
   (d) a hitch extension arm end plate, carried by the rearward end of the hitch extension arm;
   (e) a ball mount bracket, carried by the hitch extension arm end plate;
   (f) a first locking means for preventing the hitch receiver from pivoting after it has become perpendicular to the rear bumper of the tow vehicle;
      (a) a U-lock pin, carried by the top plate assembly, pivotable between an upper position that does not interfere with the pivotal movement of the hitch receiver, and a lower position that prevents the pivotal movement of the hitch receiver
   (g) a second locking means for preventing the axial extension of the hitch extension arm relative to the hitch receiver; and
   (h) vertical height adjustment means for adjusting the height of a hitch ball attached to the ball mount bracket.

6. The trailer hitch assembly of claim 5, in which the vertical height adjustment means comprises:
   (a) the extension arm end plate having a matrix of adjustment holes;
   (b) the ball mount bracket having a matrix of adjustment holes; and
   (c) fastener means for attaching the matrix of adjustment holes in the extension arm end plate to the matrix of adjustment holes in the ball mount bracket, after the ball mount bracket is positioned at a desired elevation.

7. The trailer hitch assembly of claim 5, in which the second locking means comprises:
   (a) a locking bolt carried removably insertable into a pair of locking pin holes in the hitch receiver and a pair of locking pin holes in the hitch extension arm.

8. A trailer hitch assembly, comprising:
   (a) a top plate assembly, adapted to be carried by a rear bumper of a tow vehicle, having a pivot bolt;
   (b) a hitch receiver, pivotally mounted on the pivot bolt;
   (c) a hitch extension arm, having a forward and a rearward end, slidably carried within the hitch receiver and pivotally mounted on the pivot bolt;
   (d) a hitch extension arm end plate, carried by the rearward end of the hitch extension arm;
   (e) a ball mount bracket, supporting a hitch ball, carried by the hitch extension arm end plate;
   (f) a first locking means for preventing the hitch receiver from pivoting after it has become perpendicular to the rear bumper of the tow vehicle, comprising:
      (a) a U-lock pin, carried by the top plate assembly, pivotable between an upper position that does not interfere with the pivotal movement of the hitch receiver, and a lower position that prevents the pivotal movement of the hitch receiver;
   (g) a second locking means for preventing the axial extension of the hitch extension arm relative to the hitch receiver, comprising:
      (a) a locking bolt carried removably insertable into a pair of locking pin holes in the hitch receiver and a pair of locking pin holes in the hitch extension arm; and
   (h) vertical height adjustment means for adjusting the height of a hitch ball attached to the ball mount bracket, comprising:
      (a) the extension arm end plate having a matrix of adjustment holes;
      (b) the ball mount bracket having a matrix of adjustment holes; and
      (c) fastener means for attaching the matrix of adjustment holes in the extension arm end plate to the matrix of adjustment holes in the ball mount bracket, after the ball mount bracket is positioned at a desired elevation.

* * * * *